United States Patent [19]

Leiserson

[11] Patent Number: 5,225,760
[45] Date of Patent: Jul. 6, 1993

[54] RECHARGEABLE POWER PACK

[76] Inventor: Steven G. Leiserson, 10845 Wheatlands Ave. Ste. C, Santee, Calif. 92071-7244

[21] Appl. No.: 793,122

[22] Filed: Nov. 18, 1991

[51] Int. Cl.$^5$ .............................................. H02J 7/00
[52] U.S. Cl. .......................................... 320/2; 429/98
[58] Field of Search ...................... 320/2, 5, 6, 15, 17; 429/96, 97, 98, 99, 100

[56]  References Cited
U.S. PATENT DOCUMENTS

| | | | |
|---|---|---|---|
| 3,757,194 | 9/1973 | Weber et al. | 320/2 |
| 3,883,789 | 5/1975 | Achenbach et al. | 320/2 |
| 4,389,469 | 6/1983 | Nicholls | 429/98 |
| 4,563,627 | 1/1986 | Orban | 320/2 X |

FOREIGN PATENT DOCUMENTS 0084024  3/1990  Japan ................................. 320/2

Primary Examiner—Kristine L. Peckman
Attorney, Agent, or Firm—Henri J. A. Charmasson

[57]  ABSTRACT

A rechargeable power pack is shaped and dimensioned to be inserted in the battery compartment of an electrical device. The top of the power pack is exactly symmetrical with the battery compartment cover which it replaces. The power pack houses rechargeable power cells, and has a peripheral wall spaced apart from the sides of the battery compartment mounting the battery contact terminals. Flexible prongs project from the peripheral walls to provide a wiping contact with either a spiral spring negative terminal or stationary positive terminal of the compartment. A top mounted connector allows recharging of the power pack either during or after the operation of the electrical device.

13 Claims, 1 Drawing Sheet

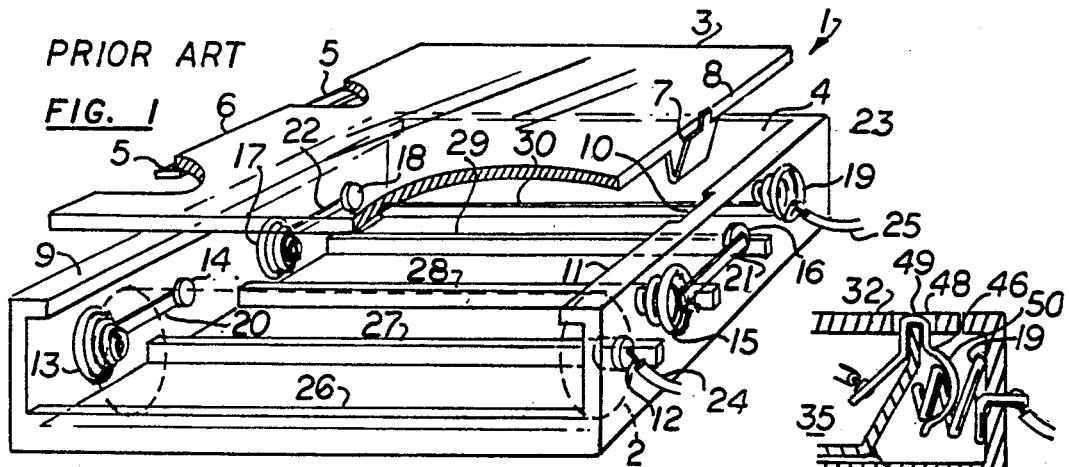
PRIOR ART
FIG. 1
FIG. 2
FIG. 3
FIG. 4
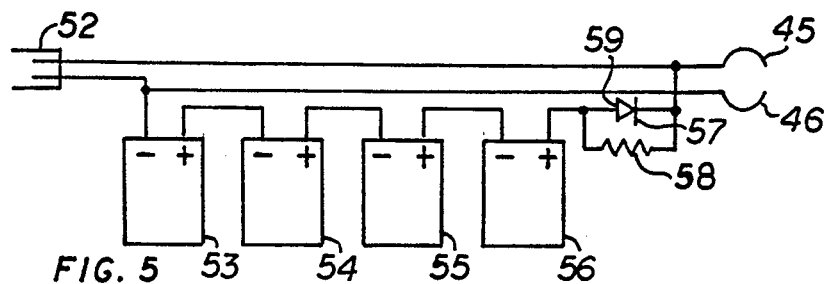
FIG. 5
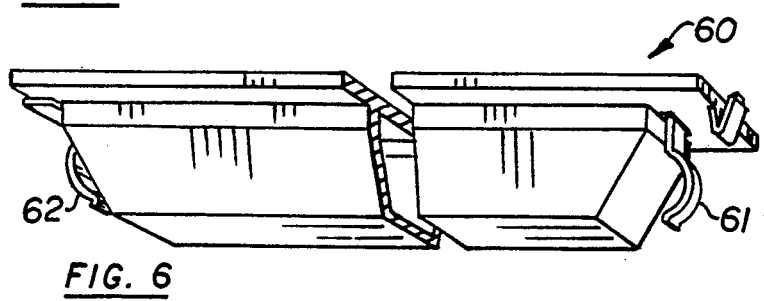
FIG. 6

RECHARGEABLE POWER PACK

FIELD OF THE INVENTION

This invention relates to rechargeable power packs for portable electrical devices.

BACKGROUND OF THE INVENTION

Many portable, battery-powered electronic devices such as radios, pagers, cassette recorders and the like have a covered battery compartment that is sized to accommodate several cylindrical batteries and to interconnect them in a parallel or a serial configuration. The sides of the compartment have spiral spring terminals designed to forcedly contact the negative, bottom poles of the batteries, and stationary plates to contact their positive top located poles. Batteries, whether rechargeable or not, must be inserted one by one between pairs of such terminals. Other electronic instruments with a higher power draw such as video recorders accept a power pack housing a plurality of rechargeable power cells. A recharged power pack may be conveniently substituted for a run-down one in a few seconds.

It would be advantageous to replace the set of batteries of the first-described type of instrument by a rechargeable power pack which would fit in the battery compartment. However, the presence of the various spiral spring terminals and the battery-separating ribs that usually lining the bottom of the battery compartment interfere with the insertion of such power packs.

SUMMARY OF THE INVENTION

The principal and secondary object of the invention is to provide a replacement for a set of batteries normally required to energize a portable electrical device by a single, rechargeable power pack that fits within the battery compartment and provides reliable contact with positive and negative terminals originally designed for contact with the various batteries positive and negative poles.

This and other valuable objects are achieved by means of a power pack shaped and dimensioned to be inserted in the battery compartment of an electrical device. The top of the power pack is exactly symmetrical with the battery compartment cover which it replaces. The power pack has a pair of flexible terminal prongs that are specially designed to provide a good contact with both the spiral spring-type negative terminal or the positive stationary terminal between which cylindrical batteries are normally inserted.

BRIEF DESCRIPTION OF THE DRAWING

FIG. 1 is a perspective view of a battery compartment of the prior art;

FIG. 2 is a perspective view of a rechargeable power pack according to the invention;

FIG. 3 is a detail view illustrating contact with a spiral-spring, negative battery terminal;

FIG. 4 is a detail view illustrating contact with a stationary, positive battery terminal;

FIG. 5 is an electrical diagram of the power pack; and

FIG. 6 is a perspective view of an alternate embodiment of the invention.

DESCRIPTION OF THE PREFERRED EMBODIMENTS OF THE INVENTION

Referring now to the drawing, there is illustrated in FIG. 1 the battery holding compartment 1 of an electrical device such as a portable radio, cassette recorder, video game unit or the like. The compartment, shown made of transparent material for the sake of clarity, is designed to hold four AA sized batteries wired in series. Only the first battery 2 is illustrated in phantom lines. A removable cover 3 closes the access 4 to the battery compartment, and is secured by a flange 5 along a section of the lower back edge 6 of the cover and a detent clip 7 mounted along front edge 8. The flange 5 bears against the underside of a ledge 9 formed in the rear rim section of the compartment 1. The detent strip 7 passes through a notch 10 in a front ledge section 11 of the compartment, then under that ledge. Each battery is inserted between two terminals 12, 13, 14, 15, 16, 17, and 18, 19. The positive poles at the top of the batteries are placed against stationary positive terminals 12, 14, 16, and 18. The negative pole forming the bottom of the batteries are pressed against spiral springs 13, 15, 17, and 19 forming the negative terminals. Straps 20, 21 and 22 between terminals 13 and 14, 15, and 16, and 17 and 18 combine the batteries into a series arrangement. The positive terminal 12 and the negative terminal 19 pass through the front wall 23 of the compartment and are connected by appropriate wiring 24, 25 to the electrical device circuits. The batteries are separated and cradled by parallel ribs 26–30 formed into the bottom of the compartment.

FIG. 2 illustrates a rechargeable power pack 31, according to the invention, that may be substituted for the four batteries and cover 3 into the compartment 1 of FIG. 1. The power pack has a flat top 32 which is exactly symmetrical to the cover 3. It also includes a rear flange 33 and a front detent clip 34 to secure the power pack 31 into the compartment 1. A tray 35 containing a group of rechargeable power cells is welded to the bottom of the cover 32. The tray comprises a peripheral wall 36 and a bottom piece 37. The front section 38 and back section 39 of the peripheral walls are spaced apart from the inner front and back walls of the compartment 1 in order to provide clearance for the spiral-spring terminals 13, 15, 17, and 19. Slots 40–44 in the bottom piece 37 are shaped and positioned to engage the ribs 26–30 in the bottom of the compartment 1 so that the tray 35 occupies the entire depth of the compartment. The median and lower portion of the front section 38 of the peripheral wall is slanted downwardly and inwardly in order to provide additional clearance for the spiral-spring terminals.

Connection between the power pack 31 and the positive and negative terminals 12 and 19 of the compartment are provided by a pair of resiliently flexible prongs 45 and 46 that extend in front of the front section 38 of the peripheral wall. The prongs 45, 46 are identical and are configured to provide a good wiping contact with either the stationary-type terminal 12 or the compressible spiral-spring terminal 19. As illustrated in FIGS. 3 and 4, each prong is formed from a small strip of copper that begins inside the tray where it is connected to the network of power cells. A hairpin-shaped portion 49 of the strip passes over the top rim of the front wall 38 through one of a pair of slots 47, 48 in the flat top 32. After running shortly downward along the upper outer surface of the front wall 38 it bows away from the front wall section 38 to form a semi-circular arcuate portion 50. When the power pack 31 is inserted into the compartment 1, the negative prong 46 slips between spiral coils of the negative spring terminal 19, providing a good contact with a terminal after a wiping movement which clears the contacting areas of any oxide or other deposit. The arcuate portion 50 of the other prong 45 comes in contact with the positive stationary terminal 12, and is deflected slightly until its apex 51 bears firmly against the positive terminal 12. The movement of the prong against the terminal also provides a good wiping movement of the contacting surfaces.

The pair of slots 47, 48 in the flat top provide access to the electrical output of the power pack for use in powering accessories or in wiring auxiliary external power packs in parallel with the one placed in the battery compartment. A recharging connector 52 is also mounted on the flat top.

The set of four rechargeable power cells 53–56 inside the tray 35 are wired in series as illustrated in FIG. 5. A diode 57 and resistor 58 wired in parallel connect the positive output of the series of power cells to the positive terminals of the charging connector 52 and the positive prong terminal 45. Since the anode 59 of the diode 57 is connected to the positive output of the power cells any charging current must pass through the current limiting resistor 58. Any current drawn from the power cells flows directly though the diode 57.

In the case where the orignal batteries are not laid side-by-side but on end in a battery compartment of an electrical device, the power pack according to the invention must have the general configuration 60 illustrated in FIG. 6. The two similar contacting prongs 61, 62 are located at opposite ends of the power pack.

The universal configuration of the power pack terminal prongs, not only will be compatible with the spiral-spring type or stationary type terminals illustrated in this example, but also with a variety of resilient and non-resilient, slotted or integral terminals which may be found in a variety of battery compartments.

While the preferred embodiments of the invention have been described, modifications can be made and other embodiments may be devised without departing from the spirit of the invention and the scope of the appended claims.

What is claimed is:

1. In combination with an electrical device having a compartment shaped and dimensioned to hold a plurality of batteries, said compartment having an opening sized to allow loading and unloading said batteries, terminals protruding from lateral sections of said compartment and wired to carry electrical currents from said batteries to electrical circuits in said device, at least one of said terminals including a resiliently compressible first contact member positioned to forcefully contact a pole of one of said batteries, and at least one of said terminals including a second contact member positioned to contact an opposite pole of said one of said batteries, and a removable cover shaped and dimensioned to close said opening, a rechargeable power supply which comprises:
 a housing shaped and dimensions to be introduced into said compartment through said opening;
 at least one rechargeable power cell mounted within said housing and having positive and negative poles;
 means for feeding a charging current to said at least one power cell when said power supply is in use in said electrical device, said means including a connector positioned on said housing to be accessible when said housing is within said compartment; and
 means for connecting said at least one power cell to said terminals.

2. In combination with an electrical device having a compartment shaped and dimensioned to hold a plurality of batteries, said compartment having an opening sized to allow loading and unloading said batteries, terminals protruding from lateral sections of said compartment and wired to carry electrical currents from said batteries to electrical circuits in said device, at least one of said terminals including a resiliently compressible first contact member positioned to forcefully contact a pole of one of said batteries, and at least one of said terminals including a second contact member positioned to contact an opposite pole of said one of said batteries, and a removable cover shaped and dimensioned to close said opening, a rechargeable power supply which comprises;
 a housing shaped and dimensioned to be introduced into said compartment through said opening; at least one rechargeable power cell mounted within said housing and having positive and negative poles;
 means for feeding a charging current to said at least one power cell; and
 means for connecting said at least one power cell to said terminals;
 wherein said housing comprises;
 a top piece having a flat peripheral border symmetrical with said cover;
 a tray bonded to said border, said tray comprising a peripheral wall substantially perpendicular to said border and a bottom piece substantially parallel to said border, said wall being sufficiently spaced-apart from said lateral section to avoid contact with said terminals; and
 a pair of resiliently flexible prongs protruding laterally from said housing and positioned to come in contact with a positive one and a negative one of said terminals.

3. The combination of claim 2, wherein said compressible member comprises a spring having a series of spiral coils; and
 each of said flexible prongs comprises a strip of metal having an arcuate portion.

4. The combination of claim 3, wherein said compartment comprises a plurality of parallel bottom ribs spaced to position and cradle said at least one power cells; and
 said bottom piece has slots positioned and dimensioned to engage said ribs.

5. The combination of claim 2, wherein said means for feeding a charging current comprise:
 a two-pole connector mounted into said top piece, said connector being wired to said prongs.

6. The combination of claim 5, wherein said means for connecting comprise:
 a resistor and a diode, said diode having an anode terminal and a cathode terminal, said resistor and diode being wired in parallel between said positive terminal and the positive pole of said at least one power cell, the anode terminal of the diode being wired to said positive pole.

7. The combination of claim 4, wherein said peripheral border has a pair of holes providing access to said means for connecting.

8. The combination of claim 3, wherein said strip of metal comprises:

a first section beginning inside said housing and passing through an aperture at the junction of a top section of said peripheral wall and of said peripheral border;

a second section substantially perpendicular to said first section and running downwardly proximate an outer portion of the peripheral wall, said second section having a median area bowing away from said outer portion of the wall in a substantially semi-circular shape forming said arcuate portion.

9. The combination of claim 8, wherein said outer portion of the peripheral wall is slanted downwardly and away from said arcuate portion of the strip of metal.

10. The combination of claim 8, wherein an apex area of the arcuate portion of said flexible prongs is positioned to wipingly come into forced contact with said second contact member.

11. The combination of claim 8, wherein the arcuate portion of one of said flexible prongs is positioned to wipingly slip between two of said coils of said resiliently compressible member.

12. The combination of claim 1, wherein said housing has a top shaped and dimensioned to close said opening in lieu of said removable cover, said connector being mounted on said top; and said means for feeding a charging current comprises a current-limiting circuit between said connector and said least at power cell.

13. The combination of claim 12, wherein said means for connecting comprises two symmetrical flexible prongs protruding from said housing and positioned to come into contact with a positive one and a negative one of said terminals when said power supply is inserted into said compartment.

* * * * *